UNITED STATES PATENT OFFICE.

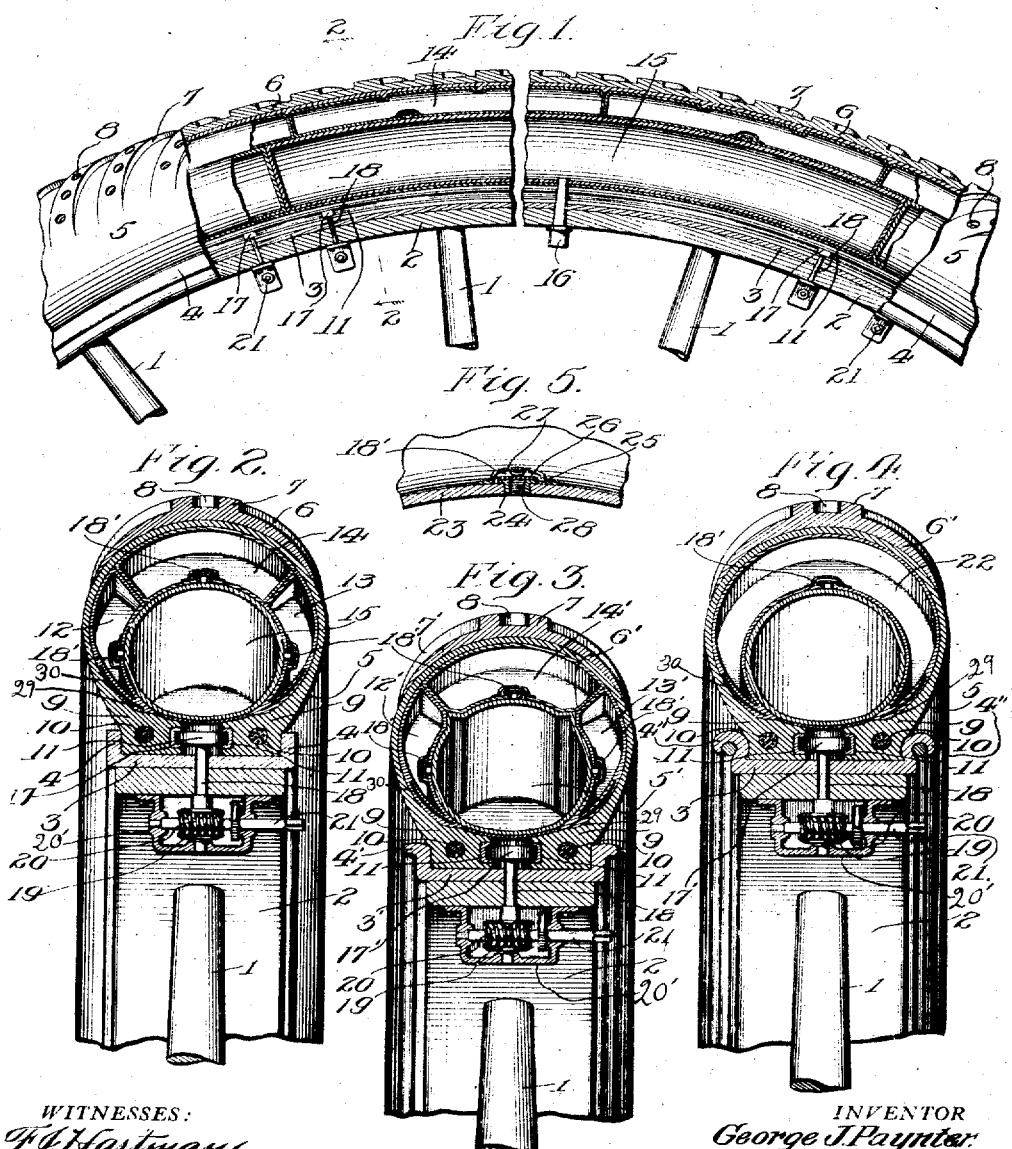

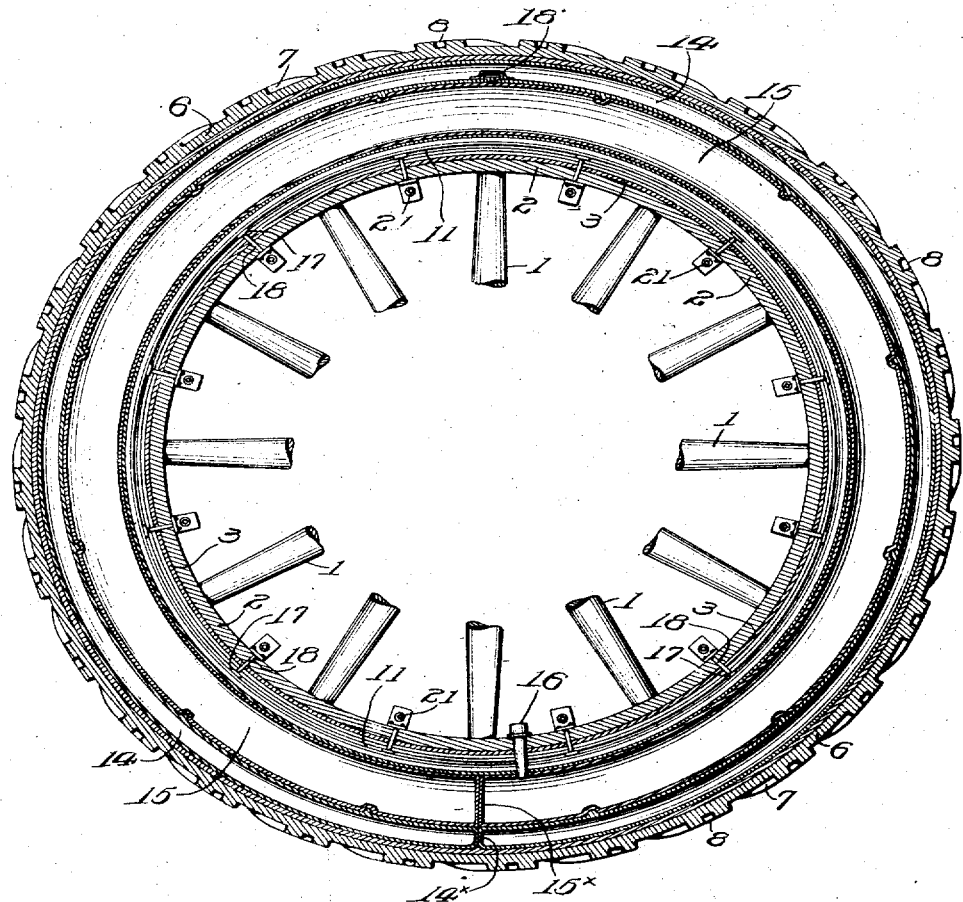

GEORGE J. PAYNTER, OF PHILADELPHIA, PENNSYLVANIA.

PNEUMATIC TIRE.

No. 912,725.      Specification of Letters Patent.      Patented Feb. 16, 1909.

Application filed November 19, 1906. Serial No. 344,011.

*To all whom it may concern:*

Be it known that I, GEORGE J. PAYNTER, a citizen of the United States, and a resident of the city of Philadelphia, in the county of Philadelphia and State of Pennsylvania, have invented certain new and useful Improvements in Pneumatic Tires, of which the following is a full, clear, and complete disclosure.

My invention relates to pneumatic tires and more particularly to that class of the same which are used on heavy vehicles.

The object of my invention is to provide a rim flanged outwardly at its sides and to which is secured a sheath of novel construction.

A further object of my invention is to inclose within a sheath, air cushions of peculiar construction and arranged relative to each other in such a manner as to expose only one, to puncture at the same time and to protect the other cushions from puncture or other damage.

For a full, clear and complete disclosure of my invention, reference may be had to the following description and accompanying drawings, in which like reference characters refer to corresponding parts.

In the drawings, Figure 1 is a side elevation of a fragmentary portion of my tire applied to the wheel rim of a vehicle, parts thereof being broken away; Fig. 2 a transverse section taken on line 2—2 of Fig. 1; Figs. 3 and 4 modifications shown in transverse section of the rim and cushions; Fig. 5, a detail view of the valve mechanism, and Fig. 6 is a sectional view of a modified form of my invention.

Referring to Figs. 1 and 2, the spokes of the wheel are indicated at 1, which are attached in the usual manner to the felly 2, to which latter is secured in any well known manner, the rim 3 having outwardly turned flanges 4—4, thus forming a channel of the rim in which may be secured the sheath 5 of the tire. To the thread of the sheath is secured the thickened portion 6, made of rubber or other suitable material, which latter has a series of rectangular projections 7 rising therefrom at regular intervals continuously around the tread. These projections 7 run transversely of the thickened portion 6 and are swung at a slight angle to the axis of the tire. Lengthwise of these projections 7 are a series of suction cups 8. The wall 5 of the sheath is made of canvas or other suitable material but terminates in thickened lips 9—9 within the channel formed by the rim 3 and its flanges 4—4. Embedded within said lips are pieces of rubber, cork or other suitable material 10—10, preferably cellular in texture. The oppositely disposed faces of the lips may or may not come together according to the degree to which the interior cushions are inflated. Within these faces, however, are embedded circumferentially disposed channel irons 11—11. The inner and side faces of the lips are shaped to conform to the outer face of the rim 3 and the inner side faces of the flanges 4—4 respectively. Within the sheath are confined a series of cushions 12, 13 and 14, which taken together are crescent shape in cross section, within which is an inner cushion 15 which will hereinafter be called a tube for the purpose of distinguishing it from the cushions around it. The tube 15 and the cushions 12, 13 and 14 are distensible and may be of any desirable length or may extend entirely around the circumference of the tire; and further, the tube 15 may have its end or ends coincident with that of one or more of the cushions or the end of any cushion may be out of alinement with the end of any other cushion or with the end of the tube. In Fig. 6 these constructions are illustrated. The tube 15 and the cushion 14 extend the full length of the tire and the ends 15× of the tube and the ends 14×of the cushions are shown in alinement with each other. In Fig. 1, however, the ends of the tube sections and the ends of the cushion sections are shown out of alinement with each other. The cushions 12, 13 and 14 are partially distended by internal pressure before the sheath is placed around the rim. The inner tube sections 15 are inflated to a sufficient degree to enable them to be inserted within, embraced by the series of cushions 12, 13 and 14 and the sheath is then closed around the outer cushions until its lips meet loosely within the channel of the rim. Each inner tube 15 is then inflated through the nozzle 16 in the usual manner of inflating tires and by virtue of its inflation becomes distended and presses on the inner walls of the cushions 12, 13 and 14, thus reducing the volume of the latter and eventually making their pressure equal to that of the pressure in the tube 15, at which point the inflation is stopped; thus within the sheath the pressure may be equal throughout the cushion.

This inflation stretches to a certain degree the sheath 5, but does not sufficiently spread the lips thereof to a sufficient extent as to secure them in frictional contact with the flanges 4—4 of the rim. For this latter purpose, I employ a spreading device which consists of a cam 17 having integral therewith an inwardly extending rod 18, which latter passes through the rim and terminates in a gear 19, which in turn meshes with a worm 20, mounted upon a rod 21, the inner end of the said rod 18, the gear 19' and the worm 20 all being inclosed in a suitable casing or housing 20' in which the rod 21 is suitably journaled. A crank having a wrench therein may be connected with the rod 21 to turn the said worm and gear which in turn revolves the rod 18 and the cam 17 until the broadest dimension of the latter has spread the circumferential angle irons 11—11 sufficiently apart to cause the lips 9—9 to be secured in frictional contact with the flanges 4—4 of the rim.

Referring to Fig. 3, I disclose a modification of my invention wherein the flanges 4' are bent laterally at their free ends in order to form a surface on which the tire 5 may seat itself when supporting an extra heavy weight. In this modification I also show the tube 5' having wedge-like projections 6'—6' projecting up between the cushions 12', 13' and 14'. In Fig. 4, I have shown another modification in which the flanges of the rim are curled laterally forming a channel having its sides slightly and inwardly inclined and flanges having curved top surfaces on which the vehicle may run, should the tire become displaced. In this modification also, I combine the chambers 12, 13 and 14 shown in Fig. 1 into a single chamber 22. While the plurality of cushions arranged around the tube in Fig. 1 exposes only the intermediate cushion to puncture or like damage, thus enabling it to be replaced without destroying the entire series, yet the single cushion 22 in Fig. 4 is less complicated, having a fewer number of parts and under some circumstances is more desirable. Otherwise, these modifications are the same in structure as that shown in Fig. 1.

As heretofore stated the cushions 12, 13 and 14 and those corresponding to the same in the two modifications are inflated to a certain degree before they are placed within the sheath. This inflation takes place through back pressure valves 18', one of which is shown in detail in Fig. 5, in which 23 represents the wall of one of the cushions or other chamber which is to be inflated. In this wall and flush with the outside surface thereof is the internally screw-threaded nipple 24, having its inner end 25 flanged over the inner surface of the wall. A disk 26, larger in diameter than the internal diameter of the nipple is movably confined within the guard piece 27 which latter is attached to the inner surface of the wall. The inflation takes place through the nipple 24, raising the disk 26, the air escaping through the perforated guard 27. When the pressure inside of the chamber becomes greater than that outside, the disk 26 falls over the inner end of the nipple 24 and closes the passage of air therethrough by virtue of being held in close contact with the nipple by back pressure. When the inflation is finished a plug 28 is inserted within the outer end of the nipple, the said plug being screwed inwardly to such an extent as to leave the surface of the wall flush.

By making the rim channel shape, I am enabled to fasten a sheath, having lips thickened to conform to the channel rim, by spreading the same apart in contradistinction to drawing or pressing the same together as is common in the art. By providing the particles of cellular rubber or other like material within the thickened portion of the lips, I am further enabled to place the same under great pressure without crushing the material of the sheath. In so arranging the inner cushions and tubes that they may be only partially inflated when inserted into the sheath, I am enabled to put the walls of the sheath under great tension after the lips have been wedged in position. This cannot be done so effectively, should the inner wall be fastened to the rim after complete inflation by any of the methods well known in the art. By having the transverse section of the outer cushion substantially crescent shape, I am enabled to more effectively exert pressure on this cushion by virtue of having a substantially maximum surface to receive the pressure from the inner tube, that is, the inner wall of the crescent presents a greater surface than a wall of other outline, such as for instance, a straight wall transversely of the sheath. Further, inasmuch as the inner tube is substantially circular in transverse section and expands radially in nearly all directions the said expansion is against a substantially constant resistance.

It has hitherto been attempted to provide the tread of a tire with depressions which act as suction cups, to cause the tire to adhere to the surface over which it is traveling, but so far as I am aware, in all those instances the suction cups have been placed close to each other so that at the point of the engagement of the tire with the ground there is very little rubber to sustain the weight of the vehicle. The result of this is that the surface provided with the suction cups is greatly compressed, the whole wear coming upon the narrow surface between the suction cups, and consequently the surface surrounding the cups is rapidly worn away smooth, and in a short time all the advantages resulting from the use of the suction cups have been lost. The same result would be produced if the tire were provided with the ordinary raised portions or projections extending substantially radially from the tire, with the projections merely provided with suction cups. In such constructions, the projection would be so weakened by the cups with which it is provided that the projection would be crushed down substantially even with the normal surface of the tire at the point of the engagement of the tire with the surface upon which the wheel of the vehicle is running. My invention overcomes the objections above set forth, by providing the sheath of the tire with ample surface for sustaining the weight of the vehicle, without being unduly compressed, there being just enough compression to the sheath to force some of the air out of the suction cups, and to cause them to adhere to the surface over which the wheel is moving. This construction produces a tire which is not rapidly worn away by the friction with the road, and which combines with it all the advantages of the suction cups for causing the tire to adhere.

From the above, it will be seen that I have constructed a tire which is provided with a tread forming a substantially corrugated surface in which both the raised and depressed portions form the tread on soft or sandy or rough roads, but in which the tops of the raised slightly elastic portions form the weight sustaining surface when the vehicle is traveling over a smooth road, such as asphalt road. In the latter instance, the cups form suction cups which cause the tire to strongly adhere to a smooth surface, thus obtaining a greater tractive force and preventing skidding.

Of course, it is obvious that a configuration of either tube or the cushions may be of other transverse sectional outline than that illustrated and described, provided that the function of my invention is still maintained as set forth in the appended claims.

I have found that the tendency of the rims is to cut or weaken the outer walls of the cushion adjacent the said rim and at the extremities of the crescent. I therefore prefer to thicken the extremities of the crescent and to embed within the thickened walls strips of reinforcing material, such as fabric. In Figs. 2, 3, and 4 I have illustrated this feature, the thickened ends being designated by the numeral 29 and the fabric by the numeral 30. By this construction the parts of the cushion adjacent the ring will wear as long or longer than the other walls of the cushion.

Having now described my invention what I desire to secure and to protect by Letters Patent of the United States is:

1. A tire having its tread provided with a series of slightly elastic projections extending substantially transversely of the tread, said series extending the length of the tread, said projections having an extended surface to support the weight of the vehicle without crushing, and being provided with depressions spaced apart from each other to form suction cups.

2. The combination with a rim having outwardly projecting side flanges of a pneumatic tire comprising a sheath inclosing a cushion crescent shape in cross section, an inner tube embraced by said cushion the requisite pressure in the latter being maintained by the inflation of the inner tube, the outer walls of said cushion being thickened near the extremities of the crescent and reinforcing pieces embedded within said thickened walls.

3. The combination with a rim having outwardly projecting side flanges, of a pneumatic tire comprising a sheath, having its edges terminating on its inner side in a pair of lips, circumferential channel pieces embedded in the oppositely disposed surfaces of said lips, the said sheath inclosing a cushion distended by internal pressure and an inflated tube embraced by said cushion, the said lips being forced outwardly against the flanges of the rim to secure the same in frictional contact therewith.

4. A combination with a rim having projecting side flanges, of a pneumatic tire comprising a sheath having its edges terminating on its inner side in a pair of thickened lips, circumferential channel pieces embedded in the oppositely disposed surfaces of said lips, the said sheath inclosing pneumatic cushions and means for forcing said lips apart to secure the sheath in frictional contact with the side flanges.

5. The combination with a rim having projecting side flanges, of a pneumatic tire comprising a sheath having its edges terminating on its inner side in a pair of thickened lips, circumferential channel pieces embedded in the oppositely disposed surfaces of the lips and means for spreading said channel pieces to secure the lips in frictional contact with the side flanges of the rim.

6. The combination with a rim having projecting side flanges, of a pneumatic tire comprising a sheath having its edges terminating on its inner side in a pair of thickened lips, circumferential channel pieces embedded in the oppositely disposed surfaces of the lips and means consisting of a series of cam surfaces for spreading said channel irons to secure the lips in frictional contact with the flanges of the rim.

7. The combination with a rim having outwardly projecting side flanges, of a pneumatic tire comprising a sheath having its edges terminating on its inner side in a pair of thickened lips, circumferential channel pieces embedded in the oppositely disposed surfaces of the lips and means consisting of cams operated by rods passing through the rim of the wheel for spreading said channel pieces to secure the lips in frictional contact with the flanges of the rim.

8. The combination with a rim having projecting side flanges, of a pneumatic tire comprising a sheath having its edges terminating on its inner side in a pair of thickened lips, circumferential channel pieces embedded in the oppositely disposed surfaces of the lips and means comprising a series of cams, a rod passing through the rim rigid with each cam and mechanism for rotating said rod to spread said channel pieces to secure the lips in frictional contact with the flanges of the rim.

9. The combination with a rim having outwardly projecting side flanges, of a pneumatic tire comprising a sheath having its edges terminating on its inner side in a pair of thickened lips, circumferential channel pieces embedded in the oppositely disposed surfaces of the lips and means consisting of a series of cams and a rod passing through the rim integral with each cam, the said rod being mounted to rotate by means of a worm and gear connection at its inner end, to secure the lips in frictional contact with the flanges of the rim.

10. The combination with a rim having outwardly projecting side flanges, of a pneumatic tire comprising a sheath having its edges terminating on its inner side in a pair of thickened lips, circumferential channel pieces embedded in the oppositely disposed surfaces of the lips, means to secure said lips in frictional contact with said flanges, said means comprising a series of cams, a rod passing through the rim, integral with each cam, each rod being mounted to rotate by means of a worm and gear connection on the inner end of the same, and a casing for inclosing said worm and gear connection.

11. A resilient tire having its tread provided with slightly elastic projections arranged in a series extending the length of said tread, said projections being provided with depressions to form suction cups, the surface of said projections between said depressions being extensive and supporting the weight of the vehicle without crushing.

12. A sheath for a tire having a series of substantially rectangular projections rising from the tread thereof, each projection having a transverse series of cup-shaped recesses in its face.

13. A sheath for a tire having a series of transverse and substantial rectangular projections rising from the tread thereof, the said projections extending obliquely to the axis of the tire and being provided with suction depressions in the surface thereof.

14. The combination with a rim having side flanges, of a pneumatic tire, comprising a sheath having its edges on its inner side, the said edges terminating in thickened lips, channel pieces embedded in the oppositely disposed surface of said lips, the said lips being shaped to conform to said flanged rim and means located between the oppositely disposed surfaces of said lips for spreading the same to engage the flanges in frictional contact.

15. The combination with a rim having side flanges, of a pneumatic tire comprising a sheath having its edges terminating on its inner side in a pair of thickened lips, channel pieces embedded in the oppositely disposed surfaces of said lips, the said lips being of a configuration to conform to the flanges of the rim and means located between the oppositely disposed surfaces of the lips to spread same into frictional contact with the said flanges and particles of rubber embedded in said lips adjacent to the edges of the flanges.

16. The combination with a rim having side flanges, of a pneumatic tire comprising a sheath having its edges terminating on its inner side in a pair of thickened lips, the said lips being of a configuration to conform to the flanges of the rim and means located between the oppositely disposed surfaces of the lips to spread same into frictional contact with the said flanges and particles of cellular rubber embedded in said lips adjacent to the edges of the flanges.

In testimony whereof, I have hereunto set my hand this 16th day of November, 1906.

GEORGE J. PAYNTER.

Witnesses:
WALTER A. HOLDEN,
ALEXANDER PARK.

It is hereby certified that in Letters Patent No. 912,725, granted February 16, 1909, upon the application of George J. Paynter, of Philadelphia, Pennsylvania, for an improvement in "Pneumatic Tires," an error appears in the the printed specification requiring correction, as follows: In line 46, page 1, the word "thread" should read *tread;* and that the said Letters Patent should be read with this correction therein that the same may conform to the record of the case in the Patent Office.

Signed and sealed this 23d day of March, A. D., 1909.

[SEAL.]

C. C. BILLINGS,
*Acting Commissioner of Patents.* surfaces of the lips and means consisting of cams operated by rods passing through the rim of the wheel for spreading said channel pieces to secure the lips in frictional contact with the flanges of the rim.

8. The combination with a rim having projecting side flanges, of a pneumatic tire comprising a sheath having its edges terminating on its inner side in a pair of thickened lips, circumferential channel pieces embedded in the oppositely disposed surfaces of the lips and means comprising a series of cams, a rod passing through the rim rigid with each cam and mechanism for rotating said rod to spread said channel pieces to secure the lips in frictional contact with the flanges of the rim.

9. The combination with a rim having outwardly projecting side flanges, of a pneumatic tire comprising a sheath having its edges terminating on its inner side in a pair of thickened lips, circumferential channel pieces embedded in the oppositely disposed surfaces of the lips and means consisting of a series of cams and a rod passing through the rim integral with each cam, the said rod being mounted to rotate by means of a worm and gear connection at its inner end, to secure the lips in frictional contact with the flanges of the rim.

10. The combination with a rim having outwardly projecting side flanges, of a pneumatic tire comprising a sheath having its edges terminating on its inner side in a pair of thickened lips, circumferential channel pieces embedded in the oppositely disposed surfaces of the lips, means to secure said lips in frictional contact with said flanges, said means comprising a series of cams, a rod passing through the rim, integral with each cam, each rod being mounted to rotate by means of a worm and gear connection on the inner end of the same, and a casing for inclosing said worm and gear connection.

11. A resilient tire having its tread provided with slightly elastic projections arranged in a series extending the length of said tread, said projections being provided with depressions to form suction cups, the surface of said projections between said depressions being extensive and supporting the weight of the vehicle without crushing.

12. A sheath for a tire having a series of substantially rectangular projections rising from the tread thereof, each projection having a transverse series of cup-shaped recesses in its face.

13. A sheath for a tire having a series of transverse and substantial rectangular projections rising from the tread thereof, the said projections extending obliquely to the axis of the tire and being provided with suction depressions in the surface thereof.

14. The combination with a rim having side flanges, of a pneumatic tire, comprising a sheath having its edges on its inner side, the said edges terminating in thickened lips, channel pieces embedded in the oppositely disposed surface of said lips, the said lips being shaped to conform to said flanged rim and means located between the oppositely disposed surfaces of said lips for spreading the same to engage the flanges in frictional contact.

15. The combination with a rim having side flanges, of a pneumatic tire comprising a sheath having its edges terminating on its inner side in a pair of thickened lips, channel pieces embedded in the oppositely disposed surfaces of said lips, the said lips being of a configuration to conform to the flanges of the rim and means located between the oppositely disposed surfaces of the lips to spread same into frictional contact with the said flanges and particles of rubber embedded in said lips adjacent to the edges of the flanges.

16. The combination with a rim having side flanges, of a pneumatic tire comprising a sheath having its edges terminating on its inner side in a pair of thickened lips, the said lips being of a configuration to conform to the flanges of the rim and means located between the oppositely disposed surfaces of the lips to spread same into frictional contact with the said flanges and particles of cellular rubber embedded in said lips adjacent to the edges of the flanges.

In testimony whereof, I have hereunto set my hand this 16th day of November, 1906.

GEORGE J. PAYNTER.

Witnesses:
WALTER A. HOLDEN,
ALEXANDER PARK.

It is hereby certified that in Letters Patent No. 912,725, granted February 16, 1909, upon the application of George J. Paynter, of Philadelphia, Pennsylvania, for an improvement in "Pneumatic Tires," an error appears in the the printed specification requiring correction, as follows: In line 46, page 1, the word "thread" should read *tread;* and that the said Letters Patent should be read with this correction therein that the same may conform to the record of the case in the Patent Office.

Signed and sealed this 23d day of March, A. D., 1909.

[SEAL.]

C. C. BILLINGS,
*Acting Commissioner of Patents.*

It is hereby certified that in Letters Patent No. 912,725, granted February 16, 1909, upon the application of George J. Paynter, of Philadelphia, Pennsylvania, for an improvement in "Pneumatic Tires," an error appears in the the printed specification requiring correction, as follows: In line 46, page 1, the word "thread" should read *tread;* and that the said Letters Patent should be read with this correction therein that the same may conform to the record of the case in the Patent Office.

Signed and sealed this 23d day of March, A. D., 1909.

[SEAL.]

C. C. BILLINGS,

*Acting Commissioner of Patents.*